UNITED STATES PATENT OFFICE.

MOSES ALEXANDER FEBREY AND THORNTON SMITH, OF WASHINGTON, D. C.

IMPROVEMENT IN ARTIFICIAL FUEL.

Specification forming part of Letters Patent No. 122,590, dated January 9, 1872.

*To all whom it may concern:*

Be it known that we, MOSES ALEXANDER FEBREY and THORNTON SMITH, of the city of Washington, in the District of Columbia, have invented certain Improvements in Artificial Fuel, of which the following is a specification:

Our invention relates to compounds for artificial fuel; and consists in combining coal-dust with certain other ingredients and then molding and drying the same in small compact lumps or cakes, suitable for use as hereinafter explained.

As is well known, various attempts have been made to utilize waste coal-dust by combining it with various ingredients so as to form it in suitable shape for fuel. But heretofore no satisfactory results have been produced. In most cases the mixture has proved more expensive than coal itself. In others the compound has burned with too much smoke, as when mixed with liquid carbonaceous matter, as tar and some resinous materials, and again in other cases the mixture has not possessed sufficient cohesive qualities to hold it together.

The object of our invention has been to produce a mixture cheaper than coal—one that will burn without smoke, and also possessing the required adhesive qualities.

To accomplish this result we take fifty (50) gallons of hot water and four (4) gallons of commercial silicate of soda, and thoroughly mix them. Into this mixture we place about a ton of coal-dust, and afterward about twenty (20) pounds of flax-seed meal, and then stir up the whole until the ingredients are well compounded and form a soft pasty mass. The mass or compound thus made we then mold into blocks of any desired size, by a brick-machine or other suitable apparatus, and then dry them, either in the open air or in dry-houses or in any other convenient manner; and when dried they will be ready for use as fuel, and also sufficiently hard for transportation and any required amount of handling.

While the silicate of soda and the flax-seed meal serve to unite the particles of the coal-dust sufficiently for most purposes, yet, if more cohesiveness is found to be necessary, we add also a small quantity of animal blood.

All of these ingredients, when combined with the coal-dust and treated as above described, we have found to greatly increase the combustible nature of the whole.

It is obvious that, in molding the mass into blocks, in order to facilitate their drying, the blocks may be left with holes or openings in them.

The use of the flax-seed meal, besides adding cohesiveness to the mass and increasing its combustible nature, also unites with the silicate of soda in such a manner that no traces of it are found upon the exterior of the blocks after they are dried.

In this way we produce an artificial fuel cheaper than coal, burning without smoke, and possessing the requisite adhesive qualities to prevent the lumps in which it is made from falling to pieces.

Having thus described our invention, what we claim is—

A composition of matter, consisting of the ingredients herein described, when combined in the proportions and in the manner herein set forth.

MOSES ALEXANDER FEBREY.
    THORNTON SMITH.

Witnesses:
    THOS. K. WALLACE,
    EDWARD DONOHOE.